July 14, 1964  E. S. ACTON  3,141,057
NON-CONTACTING MEASURING APPARATUS
Filed Feb. 15, 1961  4 Sheets-Sheet 1
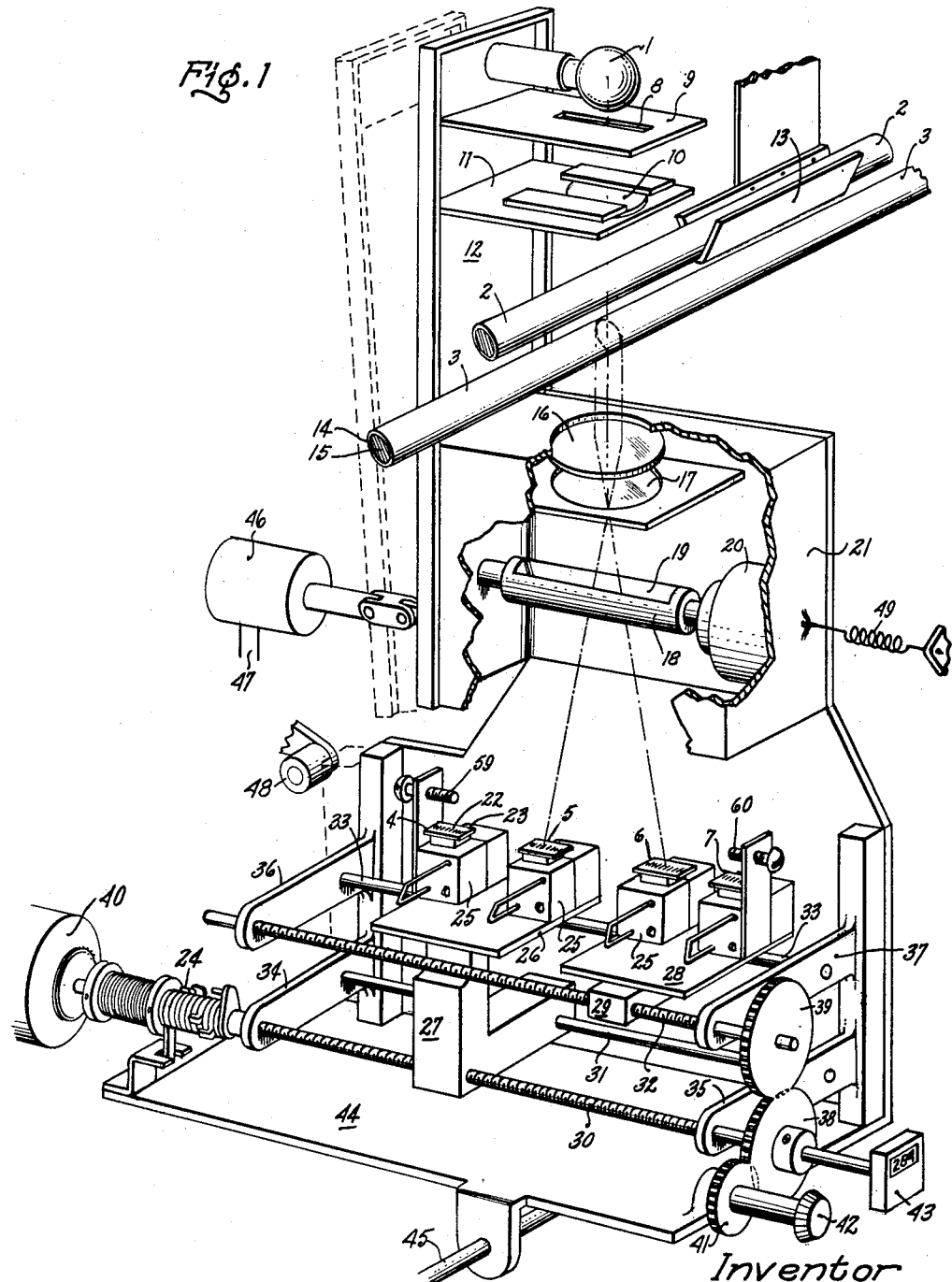
Inventor
Edward S. Acton
by Paul A. Frank
His Attorney

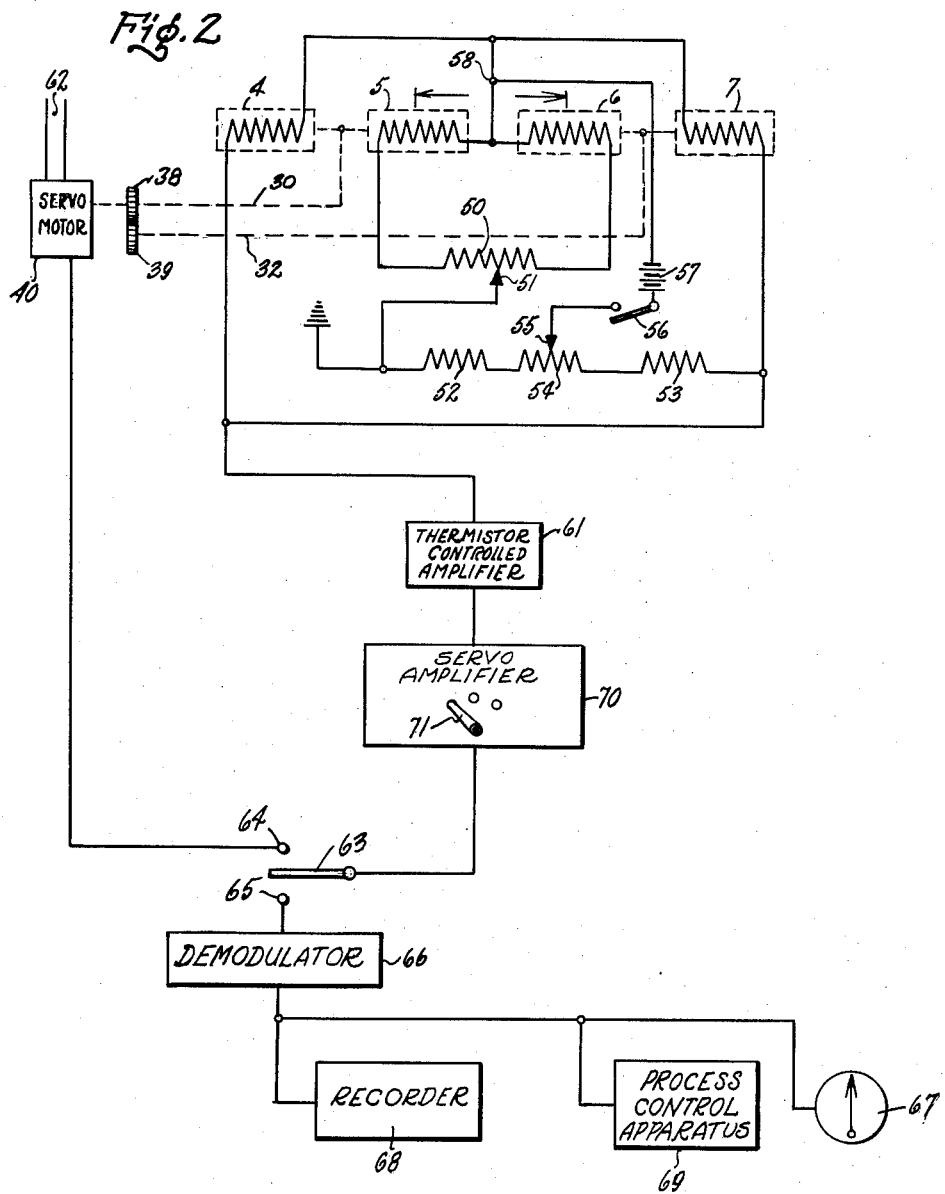

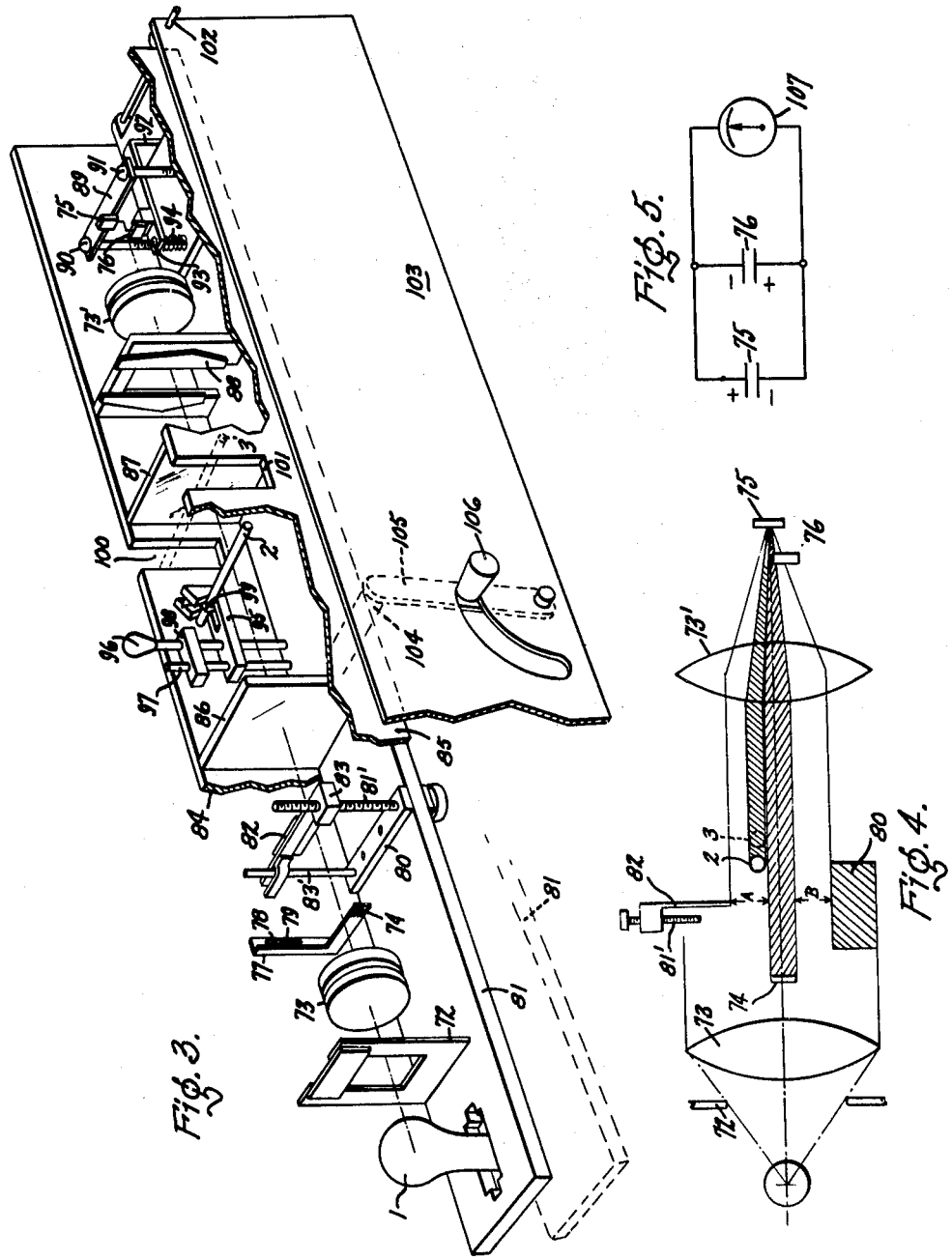

July 14, 1964 E. S. ACTON 3,141,057
NON-CONTACTING MEASURING APPARATUS
Filed Feb. 15, 1961 4 Sheets-Sheet 4

Inventor
Edward S. Acton
by Paul A. Frank
His Attorney dress# United States Patent Office 3,141,057
Patented July 14, 1964

3,141,057
NON-CONTACTING MEASURING APPARATUS
Edward S. Acton, Schenectady, N.Y., assignor to General Electric Company, a corporation of New York
Filed Feb. 15, 1961, Ser. No. 89,582
6 Claims. (Cl. 88—14)

My present invention relates to measuring apparatus and, in particular, to methods and apparatus for measuring the diameter of a moving wire or rod without contacting the wire or rod. This present application is a continuation-in-part of my application Serial No. 861,590, filed December 23, 1959, and assigned to the assignee of this present application, and now abandoned.

Certain tyes of measurement problems call for the measurement or gauging of an object without contacting that object. Such a measurement problem arises, for example, when it is required to measure the diameter of extruded insulation on wire immediately after the wire leaves the extruding die and the insulation is still very soft. The problem arises again in the measurement of extremely fine wire which is too delicate to be measured by mechanical methods. Frequently, too, the problem arises in the continuous manufacture of wire or similar products where it is not practical to use a positively contacting mechanical method of measuring the size of the wire or object. Thus, in plants for manufacturing insulated wire, the gauging of the wire during the process is often too complicated because of the continuous motion of the wire in a longitudinal direction. Another complicating factor is the whipping of a rapidly moving wire in both the horizontal and vertical planes. Because of these various factors, and the requirement of continuously gauging the dimension of the moving filament or wire, it is necessary to provide apparatus which will give the required accuracy of measurement regardless of the wire position within specified limits of motion. While in the past certain apparatus of this type of measurement has employed light beams and optical projection systems, such systems have encountered problems particularly because of the irregular movement or whip of the wire as it progressed through the light beam and optical projection system.

It is the principal object of this invention to provide new and improved methods and apparatus for accurately measuring a rapidly moving wire or the like without contacting the wire.

It is another object of this invention to provide new and improved non-contacting measuring apparatus which is capable of measuring a rapidly moving filament or wire despite undesirable movement of the filament or wire in horizontal or vertical planes.

It is still another object of my invention to provide new and improved non-contacting measuring apparatus which can be quickly adjusted to measure a broad range of filaments or wire sizes with a high degree of accuracy over a broad range of speed of movement of the filament or wire through the apparatus.

It is still another object of my invention to provide new and improved methods and apparatus for measuring a rapidly moving wire which are not affected adversely by changes in ambient temperatures and which may be practiced and used under diverse atmospheric conditions.

In its broadest aspect, my invention consists in providing methods and apparatus in which two substantially parallel beams of collimated light are projected simultaneously over two substantially identical paths to fall upon a pair of light sensitive cells connected in series circuit and adjustably positioned relative to each other and the beams to balance their voltages or currents and in which a reference wire or similar object, or a wire or object to be measured, may be selectively positioned in the path of one of the beams, the width of that one beam being adjustable so that a wide range of sizes of wire or other objects may be easily and rapidly compared with reference sizes.

In one embodiment of my invention, two collimated beams are formed by a mask inserted in a principal beam and positioned to remove the central portion of that beam, thereby eliminating any oscillations or variations of the beam resulting from thermal agitation.

In another embodiment of my invention, a wire whose diameter is to be measured is positioned between a source of light and four aligned light sensitive cells, the shadow of the wire falling on one pair of cells connected in parallel in one arm of an electrical bridge circuit, the remaining pair of cells being connected in parallel in a second arm of the bridge circuit, the bridge being balanced when the wire is of a desired diameter so that the width of the shadow of a wire being measured projected on the one pair of cells produces a voltage whose polarity and magnitude varies with deviation from a desired diameter, the voltage so produced being utilizable to indicate the diameter of a wire being measured and, if desired, to control the diameter of a wire being processed.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings, in which FIG. 1 is a perspective view partly in section of one embodiment of the measuring apparatus of my invention;

FIG. 2 is a circuit diagram of the connections of the electrical components of the measuring apparatus of FIG. 1;

FIG. 3 is a perspective view partly in section of another embodiment of the measuring apparatus of my invention;

FIG. 4 is a diagram which illustrates certain operational characteristics of the apparatus of FIG. 3;

FIG. 5 is a diagram of a portion of the electrical circuit of the apparatus of FIG. 3;

Figure 6:
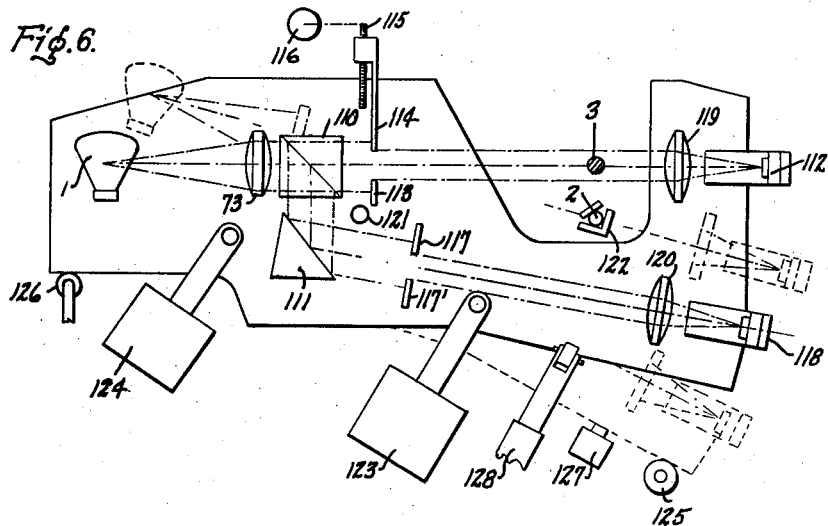
FIG. 6 is a perspective view of still another embodiment of my invention.

In the apparatus of FIG. 1, light from a projection lamp 1 is impinged selectively upon either a standard or reference wire 2, or a rapidly moving coated wire 3 the light from the lamp 1 and the shadow of the selected wire being projected to fall upon four light sensitive cells 4, 5, 6, and 7. Light from the lamp 1 is formed into a narrow collimated beam by passing through a thin rectangular aperture 8 in a plate 9. The rays of light passing through aperture 8 are formed into a coliimated beam by means of collimating lens 10 supported upon a plate 11. The lamp 1 and plates 9 and 11 are all supported from a vertical housing member 12. The reference rod or wire 12 is arranged to be placed in a support or hanger 13 which also may be supported from a portion of the apparatus housing (not illustrated).

The filament or coated wire 3 preferably passes into the measuring apparatus directly from an extrusion die or wire coating apparatus (not shown) or some similar apparatus employed in the process to which the wire or filament is being subjected. In the case of apparatus used for extruding coatings on wire, usually the coated wire 3 is at an elevated temperature and the external coating 14 on the wire core 15 is soft or of a consistency such that it is undesirable to engage the coated wire by mechanical means to determine its dimensions.

The collimated beam of light from lamp 1, after passing wire 3, is projected by means of a pair of projection lenses 16, 17 and the enlarged beam passes through a rotating light beam interrupter or chopper 18. The light beam interrupter may comprise, for example, a hollow metal tube having diametrically aligned apertures 19. The interrupter 18 may be rotated by a synchronous motor 20 supported by housing 21. The end of interrupter 18 remote from motor 20 may be journaled in any well known means (not shown) in housing member 12.

The four light sensitive cells 4–7 preferably are of identical construction and comprise a narrow light sensitive area 22 positioned upon a glass or ceramic plate 23. The material of the light sensitive area may comprise, for example, lead sulfide, although other materials, such as selenium or silicon, may be employed. Each of the cells is mounted upon a supporting block 25 and electrical connections to the cells are made in a conventional manner. Since such cells are well known, their construction and connections will not be described further.

The pair of cells 4 and 5 are mounted upon a support member 26 carried by a traversing member 27. The pair of cells 6 and 7 is mounted upon a support member 28 carried by a traversing member 29. Member 27 has a threaded portion which engages a lead screw 30 and a transverse aperture which is journaled upon a guide rod 31. Similarly, traversing member 29 has a threaded portion which engages a lead screw 32 and an aperture (not shown) through which passes guide rod 33. Lead screw 30 and guide rod 31 are journaled in two supporting arms 34, 35, and lead screw 32 and guide rod 33 are similarly supported by members 36, 37.

In order to position the cells 4–7 at desired points with respect to the beam of light projected from lamp 1, I provide means for moving the two pairs of cells simultaneously in opposite directions. This means comprises a pair of engaging gears 38, 39 mounted, respectively, on the ends of lead screws 30, 32, and a servomotor 40 attached to the opposite end of lead screw 30 through a mechanical stop 24. I also provide means for manually adjusting the position of the cells which comprises a gear 41 supported to engage gear 38 and adjusted manually by means of a knob 42. A counter or indicator 43 is attached to the right hand end of the lead screw 30 and may be calibrated to read directly the diameter of the rod or wire being measured or bear some predetermined relationship to such dimension.

The entire apparatus thus far described is supported upon a base or platform 44 mounted for limited rotation about a shaft 45. Such rotation is obtained by means of a solenoid 46 attached to housing member 12. When energized by impressing a voltage across its leads 47, solenoid 46 moves the apparatus to the left from the position where the collimated beam of light from lamp 1 falls upon wire 3 to a position where the beam of light falls upon reference rod or wire 2. A stop 48 is provided to assist in positioning lamp 1 directly over reference rod 2. During normal operation of the measuring apparatus, solenoid 46 is de-energized and the apparatus is returned to its normal position where the light from lamp 1 falls upon the wire 3, such action being obtained by any suitable means, such as a spring 49, attached to the side of the housing member 21 opposite the side to which solenoid 46 is attached, or by a second solenoid.

FIG. 2 illustrates schematically the electrical circuit of the measuring apparatus of FIG. 1. Since the light sensitive cells have a measurable resistance and a characteristic of changing resistances with light intensity variations, these elements are illustrated as resistance elements in FIG. 2. As is well known, a lead sulfide cell, for example, will have a relatively high resistance in darkness, the resistance decreasing when the cell is exposed to light.

The elements 4–7 are arranged as portions of a bridge circuit, the cells 5 and 6 being connected in parallel in one arm of such bridge circuit to form the measuring circuit for the wire shadow, and the cells 4 and 7 being connected in parallel in another arm of that circuit to form a reference or balancing circuit. For horizontal whip balancing purposes, a potentiometer 50 has a variable tap 51 connected to ground. The remaining arms of the bridge circuit are defined by a pair of fixed resistances 52, 53 and a D.C. circuit balancing potentiometer 54 having a variable contact 55 connected through a switch 56 to one terminal of a source of unidirectional potential, such as a battery 57. The opposite terminal of the source 57 is connected to the juncture or common point 58 of the two pairs of light sensitive cells 5, 6 and 4, 7.

In FIG. 2, the lead screws 30 and 32 are illustrated schematically to demonstrate the manner in which they can adjust the positions of the two pairs of light sensitive cells upon rotation of the servomotor 40.

The initial step in the operation of the measuring apparatus of FIG. 1 is its calibration. A rod or wire 2 of standard diameter is placed in holding bracket 13 and the apparatus moved to its calibration position by energizing solenoid 46. The beam of light from lamp 1 passes through the collimating lens to fall upon the rod 2. The remaining light and the shadow of rod 2 pass through lenses 16, 17 which project the beam and the shadow through light interrupter 18 to light sensitive cells 4–7. As previously explained, these four cells are mounted in a line on a horizontal plane and arranged so that lead screws 30, 32 move the two sets of cells in opposite directions. Cells 4 and 7 are partially covered by shadows from adjustable set screws 59, 60, which may be adjusted to cast a shadow upon approximately one-half of each of their respective cells. These shadows are later adjusted so that projection lamp intensity variations do not affect the balance of the bridge circuit. In adjusting the apparatus, cells 5 and 6 are initially aligned by adjusting supports 26, 28 so that the edges of the shadow of calibrating rod 2 are centered over measuring cells 5 and 6. With such alignment, it is apparent that during operation of the apparatus, when servomotor 40 turns the lead screws, there will always occur a point at which the centers of cells 5 and 6 are in line with the edges of the shadow projected by either a reference rod 2 of a wire 3 being measured. When the cells are thus positioned with the shadow of the reference rod falling at the midpoint of cells 5 and 6, set screws 59, 60 are adjusted so that they project a shadow over one-half of their associated cells 4, 7. The portion of the light beam falling on cells 4 and 7 should balance the light provided by the portion of the beam falling on the outer halves of cells 5 and 6; the wire shadow or the reference rod shadow covers the inner halves of cells 5 and 6.

This light beam balancing makes the bridge circuit insensitive to variations in the intensity of the projection lamp, thus eliminating voltage fluctuation effects.

Since light sensitive cells, such as the cells 4–7, are sensitive to temperature variations, being more sensitive and having higher resistance at very low temperatures, I provide means to both eliminate the effects of warm up time of the gauging system and correct for temperature change in the cells which otherwise would affect the output of the bridge circuit. This means comprises a thermistor controller amplifier 61 connected to the output of the bridge circuit previously described. Amplifier 61 is of a type which uses a thermistor (not shown) to control the gain of the amplifier in response to the temperature and resistance of the thermistor, which preferably is located adjacent to the cells 4–7.

In the operation of my measuring apparatus, the light interrupter or chopper 18 functions to turn light from the lamp 1 on and off cells 4–7. With the action of the interrupter, the cells are darkened one instant and light the next. When dark, the condition of all four cells is the same. When light, resistance of cells 5 and 6 depends upon the size of the shadow cast upon these cells by either the reference wire 2 or the wire 3 being measured. The resistance of cells 4 and 7, however, remains constant, being determined by the fixed shadow cast upon these cells by the set screws 59, 60. As previously mentioned, the motor rotating the interrupter 18 is preferably a synchronous motor. If, for example, this motor rotates at 1,800 r.p.m. and interrupter 18 has two parallel slots, 3,600 on and off pulses per minute of the light beam are cast upon light sensitive cells 4–7. The effect of this interruption is to generate a 60-cycle alternating voltage across the cells 4–7. Because of the connection of the cells in the bridge circuit, the alternating voltage developed across reference cells 4 and 7 is opposite in phase to that developed across measuring cells 5, 6. If the amplitude of these two voltages is the same, then no output voltage is supplied to amplifier 61. However, if the voltage developed across cells 5, 6 is either larger or smaller than that developed across the cells 4 and 7, which have a fixed resistance, the voltage supplied to amplifier 61 is of the same phase as the larger of the voltages developed in the two sets of cells and equal to their difference. This difference voltage, which is the output voltage of the bridge circuit, is amplified by the thermistor amplifier 61 and the servoamplifier 70, and its phase relationship to a reference 60-cycle alternating voltage supplied by leads 62 may be used to move the servomotor in the proper direction to balance the positions of cells 5 and 6. Such a correction may be affected by connecting switch 63 to terminal 64 to supply the difference voltage to the servo motor. Alternatively, by connecting switch 63 to terminal 65, this difference voltage may be supplied to a demodulating circuit, the output of which may be provided to either a meter 67 or a recorder 68. This voltage may be applied, likewise, to process control apparatus indicated by the rectangle 69.

The diameter ranges of this apparatus may be changed by moving the cell supports 26 and 28 closer for smaller diameters and further apart for larger diameters, using the servomotor 40 or the hand knob 42 to rotate the lead screws 30 and 32. Further ranges can be covered by changing the magnification of the projection lens 17.

The meter 67 range may be changed using a selector switch 71 which changes the gain of the servoamplifier 70. In this way, full scale on the meter may be plus or minus 10 mils or 20 mils, or whatever range is desired; at null the meter reads zero at the center of the scale. This is the normal position of the meter after the servomotor is caused to reach the null position using a standard or reference rod or wire 2 of known diameter.

My apparatus may be used solely as a measuring device, in which instance the meter 67 may be employed to observe variations in diameter of the wire being measured. A continuous record of diameter variations may be obtained by employing a strip type recorder 68. In this connection, the counter 43, likewise, provides an additional useful function in that when a standard rod of a known dimension is measured and the apparatus is balanced, by rotating the knob 42, dimensions either larger or smaller than the standard rod by a desired amount can be established and the dimension of wire 3 compared with such otherwise established dimension rather than the standard or calibrating rod.

The output of the apparatus may, likewise, be employed by applying it to process control apparatus to either decrease or increase the diameter of insulation applied to a wire. Thus, the output voltage of demodulator 66 may be used to regulate a process control variable such as the speed of the wire through an extruding die.

An important feature of my improved apparatus is that it compensates for any horizontal motion or whip of the wire being measured. This is obtained by using the cells 5 and 6 in parallel. Each of these cells has linear characteristics and is matched as closely as possible. Potentiometer 51 is used to match the cells for horizontal whip and compensates for cell differences. It is apparent that there is no appreciable change in net resistance of the of the cell combination as the shadow being measured moves back and forth across the two cells. If a greater portion of cell 5 is covered by the shadow, its resistance increases. This increase, of course, is offset by a decrease in the resistance of cell 6 as more light falls upon it.

Another important feature of my invention is that any vertical displacement of the wire within tolerable limits is compensated by the optical system of the apparatus. By means of the system of lenses employed, wire 3 may move vertically over a substantial range and still produce no appreciable change in the signal from the bridge circuit. To effect such compensation, however, it is important that the standard or reference rod 2 be positioned properly for accurate automatic calibration. To provide this function, the bracket 13 is precisely preset to hold the reference rod in a correct position vertically. Likewise, it is set and centered horizontally over cells 5 and 6 when the apparatus is in the calibration position.

In the embodiment of my apparatus shown in FIG. 3, light from the lamp 1, which may be supported for adjustment either laterally or longitudinally of the instrument, is collimated by passing through a mask 72 and a collimating lens 73. The collimated beam is formed into two beams, which will be referred to as the "upper" and "lower" beams, by means of a light beam mask 74 positioned in front of collimating lens 73. The two beams are ultimately collected by condensing lens 73' and focused thereby so that the upper beam falls upon a measuring cell 75 and the lower beam falls upon a balancing cell 76. While cells 75, 76 may be constructed similar to cells 4–7 of the apparatus of FIG. 1, preferably they are silicon solar cells, photovoltaic in nature.

Light beam mask 74 is supported by an arm 77 having a slot 78 therein, through which extends a screw 79 for fixing the vertical position of the mask relative to the bear of collimated light. The lower edge of the lower beam is defined by means of a support block 80 fastened by means of suitable screws to base member 81. Extending upwardly from support block 80 are a micrometer lead screw 81' and a guide post 83'. Micrometer lead screw 81', which may be rotated by means of its knurled lead, provides means for vertically positioning an aperture plate 82 which defines the upper edge of the upper beam. Aperture plate 82 is carried by a cross-member 83 which, at one end, threadedly engages micrometer lead screw 81' and, at its other end, is provided with a pair of fingers which engage guide post 83'.

The elements 72–74, 80 and 82, located at the left hand end of the instrument of FIG. 3, cooperatively comprise the beam defining portion of the instrument. This portion is contained within a housing defined by base 81, side walls 84, 85, a removable cover and end wall (not shown), and a transverse glass plate 86. At the right hand end of my instrument is positioned the beam collecting and measuring portion of the instrument. This portion, which lies to the right of a second transverse glass plate 87, comprises a vertical aperture plate 88, lens 73', and the cells 75, 76. The vertical aperture plate 88 may be adjusted laterally to define the width of the upper and lower beams and to make the beam intensity linear, thereby to permit vertical movement or whip of the wire without introducing any error in the output signal or voltage of cell 75. Measuring cell 75 is supported by a transverse cell holder 89, which may be adjusted vertically by means of screws 90, 91. Balance cell 76 is carried by an L-shaped support member 92 affixed at one end by means (not shown) and adjustable vertically at its left end by means of screw 93 working against an opposing spring 94.

Positioned between the beam defining portion and the beam collecting and measuring portion of my instrument I provide a sample holding portion defined by side walls 84, 85 and transverse glass plates 86, 87. In the sample holding portion I provide means for adjustably supporting a reference rod or wire 2 which comprises a support block 95 fastened to a push rod 96 and loosely journaled on the guide rod 97. Push rod 96 is supported by a guide block 98 and a bottom support not shown. Reference rod 2 is maintained in support block 95 by means of a spring clip 99. Push rod 96 preferably is operative to move the reference rod vertically between a first position where it lies within the upper beam and a second position where it is entirely removed from the upper beam. If desired, a solenoid (not shown), located at the bottom of the instrument, may be provided to move the reference rod between these positions for automatic calibration of the instrument.

I provide a pair of vertical apertures 100, 101 in side walls 84, 85, respectively, to define means for permitting a wire or rod 3 to be measured as it passes through the instrument. It will be observed that in this construction the transverse glass plates 86, 87 provide dust-free portions for the beam forming and beam collecting and measuring portion of my instrument, thus assuring greater accuracy under diverse operating conditions. The The transverse glass plates 86, 87, which may be removable if desired, thus assure that both light beams; i.e., the upper and lower beams, are projected over substantially identical paths over their entire length.

In order to facilitate calibration of the instrument of FIG. 3, base member 81 is rotatably mounted on a rod 102 supported in a side wall 103 and may be moved vertically by means of a transverse rod 104, which supports base member 81 vertically during normal operation of the instrument. When it is desired to calibrate the instrument, rod 104, which is carried by an arm 105, is moved to the left by means of handle 106 to lower base member 81 to a position where the wire being measured passes vertically through apertures 100, 101 to a position external of the instrument. When the instrument is in this lower position, reference rod 2 may be moved by means of push rod 96 to the position in which it lies within the path of the upper beam. When calibration is completed, the reference rod is moved to its alternate position out of the path of the upper beam and base 81 returned to its operative location by rotating arm 105 to a vertical position.

The operating principles and adjustable features of the instrument of FIG. 3 may best be illustrated by reference to the schematic view given in FIG. 4. Light from source 1, after passing through mask block 72 and collimating lens 73, is defined into upper beam A and lower beam B by means of mask 74, support 80 and aperture plate 82. A wire 3, whose diameter is to be measured, is traversed by only the upper beam A. The two beams are collected by lens 73' and focused, respectively, on measuring cell 75 and balancing cell 76. Initial adjustment of the instrument is made without rod 2 or wire 3 in position. Likewise, mask 74 is moved to a position where it does not fall within the path of the light beam. By means of micrometer lead screw 81', aperture plate 82 is adjusted to provide a desired total vertical width of beam from source 1. With the measuring cell 75 set at a desired position with the lamp filament image centered on its face, the position of cell 76 is adjusted by means of screw 93 to obtain a balanced reading in meter 107 (shown in FIG. 5) connected across the serially connected cells 75, 76.

After this initial adjustment, mask 74 is moved into a position such that it both removes the center portion of the collimated beam of light from source 1 to form upper beam A and lower beam B and also gives a balanced reading in meter 107. With the instrument thus balanced, a reference rod or wire 2 is moved into the path of the upper beam A by means of push rod 96. Since the amount of light falling upon measuring cell 75 is reduced with the insertion of the reference rod in the upper beam, aperture plate 82 is moved vertically to increase the total width of beam A to a value such that it is equal to the sum of beam A plus the width of reference rod 2. This width is obtained by noting the return to balance of the series circuit of cells 75, 76, as indicated by meter 107. After these initial adjustments, only the micrometer lead screw 81' need be turned to change the diameter range of the instrument.

After calibration the instrument is moved to an operating position by raising base plate 81 vertically by means of arm 105 and support 104 and removing reference rod 2 from the path of beam A by means of push rod 96.

One of the advantages of the arrangement of the instrument of FIG. 3 is that the light beam mask 74, positioned to remove the central portion of the collimated light beam, eliminates any oscillation of the beam due to thermal agitation. Such thermal agitation otherwise would produce a noise voltage in the output of the measuring and balancing cells, the noise voltage being caused by changes in the index of refraction of the air through which the light beam passes, such changes being caused by changes in temperature. In this manner, any variation in the temperature in the central portion of the instrument, through which the wire being measured passes, has no effect on the accuracy of the instrument.

In the instrument of FIG. 3, likewise, the vertical aperture plate 88 provides means for eliminating any inaccuracy due to vertical whip of the wire by adjusting the width of the beam to provide a beam of linear light intensity. The vertical plate 88 may be tilted in or out, or may be curved to match the light intensity from the lenses. Horizontal whip inaccuracy is eliminated by aligning lamp 1 and lens 73 to provide a collimated beam of light in a horizontal plane.

In the embodiment of my instrument illustrated in FIG. 6, the collimated beam of light instead of being divided into two beams of light by means of mask 74 of the instrument illustrated in FIG. 3, is formed into two beams by means of a pair of prisms 110, 111. The beam of light which falls upon a measuring cell 112 is defined by the edges of fixed plate 113 and a vertically movable plate 114. The latter may be automatically adjusted by means of a lead screw 115 driven by servomotor 116. The balancing beam of light obtained by means of prisms 110, 111 is defined by adjustable plates 117, 117' and falls upon a balancing cell 118. Separate collecting and focusing lenses 119, 120 are provided for the respective cells 112, 118.

The instrument of FIG. 6 preferably is journaled about a pivot 121 for rotation between positions where the measuring beam defined by plates 113, 114 may fall selectively either upon a wire 3, whose diameter is to be measured, or upon a reference wire 2 supported in a suitable holder 122. Movement between these two positions may be obtained by means of a solenoid 123 used to rotate the instrument to a calibration position and a solenoid 124 employed to return the instrument to a position for measuring the diameter of a wire. Suitable stops 125, 126 are provided to limit rotation of the instrument between the calibrating and measuring positions. A microswitch 127, engaged by the instrument when it is rotated to its calibrating position, is provided to control operation of servomotor 116 to adjust the position of aperture plate 114 to the opening required for balancing the outputs of cells 112, 118 when the upper beam impinges upon a reference wire. A second microswitch 128 is provided to remove the meter 129 (shown in FIG. 7) from the measurement circuit during the calibration period.

Figure 7:
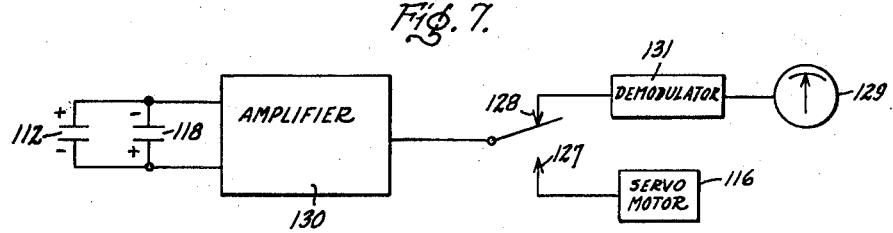
FIG. 7 is a block diagram of the electrical circuit of the apparatus of FIG. 6.

The circuit of the instrument of FIG. 6 is shown schematically in FIG. 7. In this circuit, measuring cell 112 and balancing cell 118 are connected in series circuit and to a conventional amplifier 130. The output of conventional amplifier 130 is supplied either through switch 128 to a demodulator 131 and current or voltage sensitive meter 129 or through switch 127 to servomotor 116.

While I have described my measuring apparatus in connection with the measurement of a wire coated withinsulation, it is apparent that the apparatus can be used, likewise, to measure the diameter of very fine wire, which would be injured by any measuring apparatus requiring mechanical contact with the wire, to measure the diameter of rods or similar products, or to measure a dimension of any surface that can be projected as a shadow.

In the foregoing also I have discussed the use of my gauge for measuring the diameter or rods. It is apparent that by using two such instruments in series and combining their output voltages or signals to obtain a difference signal, it is possible to measure a wire both before and after a coating process to determine accurately the thickness of a coating deposited upon such a wire. One of the advantages of my instrument is that it does not require any contact with such a wire either before or after the coating process. Furthermore, particularly in the form illustrated in FIG. 3, my invention provides an instrument which is not affected by normal variations in temperature or environment.

While I have shown a particular embodiment of my invention, it is, of course, to be understood that I do not wish to be limited thereto since various modifications may be made, and I contemplate by the appended claims to cover all such modifications as fall within the true spirit and scope of my invention.

What I claim as new and desire to secure by Letters Patent of the United States is:

1. Apparatus for measuring a dimension of an object comprising a pair of light sensitive cells connected in series circuit, means for forming a beam of collimated light and projecting a portion of said single beam upon one of said cells, means for projecting a second portion of said beam selectively upon a dimension of an object to be measured or upon a corresponding dimension of a reference object, the shadow of such object and the unobstructed rays of said second portion falling upon the other of said cells, a measuring device connected across said cells, means for adjusting the amount of light from said beam falling on said one cell when the unobstructed second portion falls on said other cell to obtain a desired indication on said device, and means for adjusting the width of said second portion reaching said other cell when a reference object is placed in said second portion to obtain said desired indication, whereby when the shadow of an object to be measured falls upon said other cell said device indicates the measurement of the dimension of such object.

2. Apparatus for measuring the diameter of a wire or the like comprising a pair of light sensitive cells positioned adjacent each other and connected in electrical series circuit, current responsive means connected across said cells, means for forming a single beam of collimated light, means dividing the beam of light into two substantially parallel portions and projecting each portion on a respective one of said cells, means for adjusting the amount of light falling on one of said cells to obtain a desired current flow condition in said current responsive means, means for selectively positioning a wire to be measured or a reference wire in one of said portions, and means for adjusting the width of said one portion falling on its respective cell to obtain said desired current flow condition when a reference wire is positioned in said one portion, whereby when a wire to be measured is positioned in said one portion said current responsive means varies with the diameter of such wire.

3. Apparatus for measuring the diameter of a wire or the like comprising a balancing light sensitive cell and a measuring light sensitive cell positioned adjacent each other and connected in electrical series circuit, a meter connected across said circuit, means for forming a beam of collimated light, means for projecting a first portion of the beam on said balancing cell and a second portion on said measuring cell, means for adjusting the position of one of said cells to obtain a desired reading on said meter, means for selectively positioning a wire to be measured or a reference wire in said second portion of said beam, means including an adjustable obstruction position in said second portion for adjusting the amount of light falling on said measuring cell when a reference wire is positioned in said second portion to obtain said desired reading, whereby when a wire to be measured is positioned in said second portion said meter indicates the diameter of such wire.

4. The method of measuring the diameter of a moving wire which consists in projecting simultaneously two portions of a beam of collimated light over paths subjected to substantially identical conditions and upon a pair of light sensitive cells connected in series circuit, adjusting the amount of light falling on the cells to obtain a balanced condition in the circuit, positioning a reference wire in the path of one of the portions and adjusting the width of the one portion reaching one of the cells to rebalance the circuit, removing the reference wire from the one portion and passing a wire to be measured through the one portion, whereby a difference in the diameter of such wire and that of the reference wire is indicated by an unbalance in the circuit.

5. The method of measuring the diameter of a wire or the like which consists in forming a beam of collimated light, removing the central portion of the beam to form two substantially parallel beams, projecting the two beams over paths subjected to substantially identical conditions and upon a pair of light sensitive cells connected in series circuit, adjusting the amount of light falling on the cells to obtain a balanced condition in the circuit, positioning a reference wire in the path of one of the pair of beams and adjusting the width of the one beam to rebalance the circuit, and passing a wire to be measured through the one beam, whereby a difference in the diameter of such wire and that of the reference wire is indicated by an unbalance in the circuit.

6. Apparatus for measuring the diameter of a wire or the like comprising a balancing light sensitive cell and a measuring light sensitive cell positioned adjacent each other and connected in electrical series circuit, a meter connected across said circuit, means including a first lens for forming a single beam of collimated light, means for dividing said beam into two substantially parallel portions subjected to substantially identical conditions, said dividing means comprising an adjustable mask positioned in said beam, means including a second lens for projecting a first portion of the beam on said balancing cell and a second portion on said measuring cell, means transverse to said dividing means for defining outer edges of both portions of said beam, means for adjusting the position of said balancing cell to obtain a desired indication on said meter, means for selectively positioning a reference wire or a wire to be measured in said second portion of said beam, means including an adjustable aperture plate positioned to define an edge of said second portion transverse to its outer edge and adjust the amount of light projected on said measuring cell when a reference wire is positioned in said second portion to obtain said desired reading, whereby when a wire to be measured is positioned in said second portion said meter indicates the diameter of such wire.

References Cited in the file of this patent

UNITED STATES PATENTS

| | | |
|---|---|---|
| 2,065,365 | Doyle et al. | Dec. 22, 1936 |
| 2,085,671 | Powers | June 29, 1937 |
| 2,139,474 | Shepard | Dec. 6, 1938 |
| 2,289,551 | Reason | July 14, 1942 |
| 2,415,174 | Hurley | Feb. 4, 1947 |

(Other references on following page)

UNITED STATES PATENTS

| | | |
|---|---|---|
| 2,415,177 | Hurley | Feb. 4, 1947 |
| 2,415,178 | Hurley | Feb. 4, 1947 |
| 2,505,316 | Wilmotte et al. | Apr. 25, 1950 |
| 2,510,347 | Perkins | June 6, 1950 |
| 2,532,964 | Taylor et al. | Dec. 5, 1950 |
| 2,548,755 | Vossberg et al. | Apr. 10, 1951 |
| 2,565,500 | Ingham | Aug. 28, 1951 |
| 2,670,650 | Wilmotte | Mar. 2, 1954 |
| 2,699,701 | Strother et al. | Jan. 18, 1955 |
| 2,895,373 | Eyraud | July 21, 1959 |
| 3,017,801 | Ingber | Jan. 23, 1962 |

FOREIGN PATENTS

| | | |
|---|---|---|
| 885,931 | Germany | July 8, 1949 |
| 211,564 | Austria | Oct. 25, 1960 |